JACK L. HOFFA
JERRY E. ROCHTE
INVENTORS

BY Paul K Harder

ATTORNEY

JACK L. HOFFA
JERRY E. ROCHTE
*INVENTORS*

United States Patent Office 3,540,856
Patented Nov. 17, 1970

3,540,856
SAMPLE CAPSULE AND FILTERING MECHANISM
Jerry E. Rochte, Seal Beach, and Jack L. Hoffa, Brea, Calif., assignors to Beckman Instruments, Inc., a corporation of California
Filed Jan. 22, 1968, Ser. No. 699,619
Int. Cl. B01d 29/36
U.S. Cl. 23—292                                 9 Claims

ABSTRACT OF THE DISCLOSURE

A sample capsule having a cup or well of special form in which a sample is precipitated and a filter cup, with a filter paper bottom, is received atop the precipitated sample, and mechanism for automatically dropping the filter cup into the capsule and applying a vacuum thereto for drawing clear filtrate up through the filter paper bottom into the filter cup for further processing.

---

This application is related to the following applications, filed concurrently herewith, all assigned to the same assignee as the present application:

Ser. No. 699,682 for Sample Holder With Filter Means by Jerry E. Rochte et al.;

Ser. No. 699,486 for Sample Holder With Centrifugation Means by Jerry E. Rochte;

Ser. No. 699,520 for Sample Capsule and Filtering Mechanism by Donald N. Martin; and Ser. No. 699,618 for Automated Chemical Analyzer by Jerry E. Rochte et al.

The present invention relates to automated chemical analyzers and more particularly to wet chemical or clinical sample holders or capsules having a mechanism for filtering a liquid carried by the capsule.

During the processing of wet chemicals or clinical liquids it is often necessary to add a reagent to a fluid for reacting the same; for example, the addition of tungstic acid to diluted blood serum for precipitation of the blood protein. However, before analysis may proceed further, the precipitant must be filtered out since its presence interferes with such analysis and is therefore undesirable. It has been proposed to apply pressure to the reacted fluid, as by means of an expanding bladder or a pair of opposing external rams or the combination of mechanical and air pressure, for forcing the fluid through a filter which traps the solids therein and thereby provides a clear filtrate for further analysis.

It is an object of the present invention to provide new and improved means for filtering the fluid in the capsule itself.

Another object is the provision of a modified form of sample capsule and a filter cup cooperating therewith for filtering the reacted fluid in a facile and reliable manner while contained in the capsule.

A further object is to provide means for automatically dropping the filter cup into the sample capsule and applying a vacuum to the cup for drawing clear filtrate thereinto.

For the achievement of the aforementioned and other objects and advantages, the present invention contemplates and is concerned with a sample capsule having a cup or well of tapered configuration in which the sample is precipitated and a filter cup, with a filter paper bottom, is received atop the precipitated sample, and mechanism for automatically dropping the filter cup into the capsule and applying a vacuum thereto for drawing clear filtrate up through the filter paper bottom into the filter cup for further processing.

Other objects, advantages and features of the present invention will become better understood by reference to the following description when considered in connection with the accompanying drawing wherein.

Figure 1:
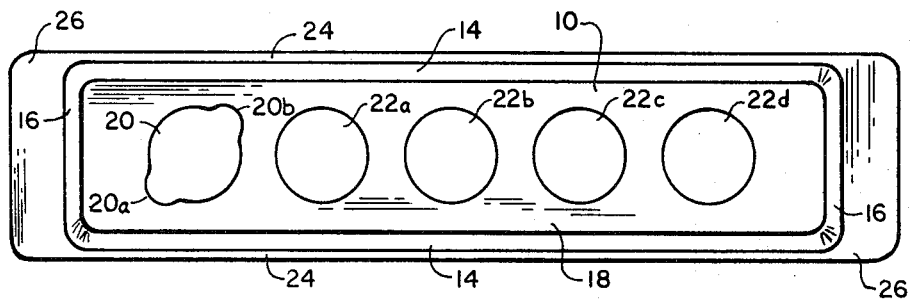
FIG. 1 is a plan view of a sample capsule embodying the principles of the present invention.
Figure 2:
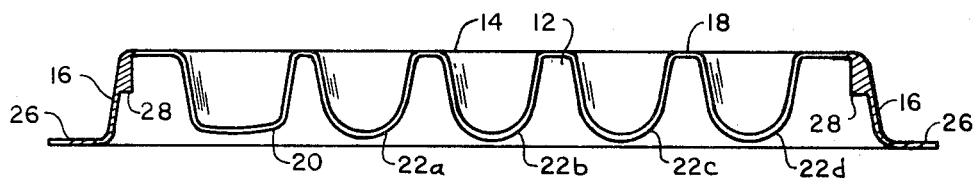
FIG. 2 is a side elevation, in section, of the capsule of FIG. 1.

Referring now to the drawing, there is illustrated in FIG. 1 a sample holder or capsule 10 which may be fabricated of any suitable material in a facile and economical manner as it is intended to be disposable and destroyed or discarded after use. For example, it may be molded of readily available plastics such as polyethylene, polypropylene, and the like, which provide an amount of flexibility as well as being of sufficient rigidity for the purpose at hand. As seen in FIGS. 1 and 2, capsule 10 is of hollow, open bottom, body construction 12 with sides 14 and end walls 16 of trapezoidal shape and joined at the upper edges thereof by a top 18, which has formed therein compartments, wells or cups 20 and 22a–d depending into the space between the sides and end walls, cup 20 being provided with diagonally disposed enlargements or scallops 20a and b which are essentially inverted semiconical portions merging with the frusto-conical portions of the side walls to give the compartment 20 its unique shape for a purpose later appearing. A narrow stiffening rib 24 extends along the lower edge of each of the sides and merges at its end into end tabs 26. Within the hollow body 12, at the juncture of the end walls 16 and top 18, there is an additional thickness of material for providing a pair of ledges or shoulders 28 facing downwardly by which the capsules may be nested or stacked without binding or sticking.

Figure 3:
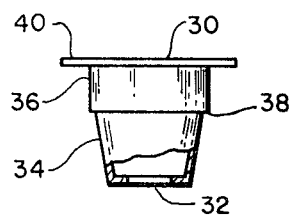
FIG. 3 is a front elevation, partly in section, of a filter cup embodying the principles of the present invention and adapted to be placed in the capsule.
Figure 4:
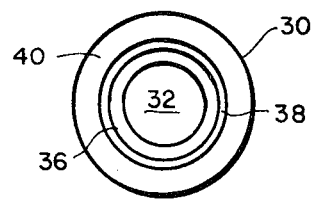
FIG. 4 is a plan view of the filter cup of FIG. 3.

FIGS. 3 and 4 illustrate a filter cup 30 which is adapted to be used with the capsule 10 for filtering material contained in well or cup 20 thereof. Filter cup 30 may be fabricated by utilizing the methods and materials similar to those used for manufacture of the capsule 10, except that bottom 32 of the filter cup is of filter paper or other appropriate porous material. The filter cup is formed with a tapered or frusto-conical portion 34, to which the filter paper bottom 32 is bounded or sealed, a cylindrical portion 36 having a downwardly facing ledge or shoulder 38, and a flat annular rim 40, the rim having a diameter slightly less than the distance across the far edges of the scallops 20a and b to permit the escape of air when the filter cup is dropped into the compartment 20.

Shoulder 38 provides for nesting or stacking of the filter cups without sticking or binding and rim 40 is adapted to engage the top 18 of the capsule during the filtering process, later described.

Turning now to FIGS. 5–9, there is illustrated a filtering mechanism embodying the principles of the present invention and including a filter cup dispenser or loader 42 and a vacuum application device 44 supported on a mounting plate 46 which at one end thereof is provided with an angle bracket 48 defining with the plate 46 a notch 50 in which a structural member is adapted to be received for adjustably mounting the filter mechanism thereon.

Figure 6:
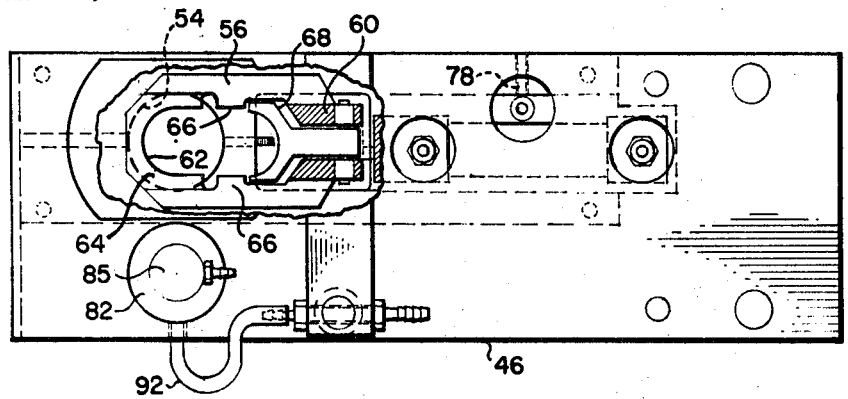
FIG. 6 is a plan view of the mechanism of FIG. 5 with portions thereof broken away to show the relationship of the parts.
Figure 5:
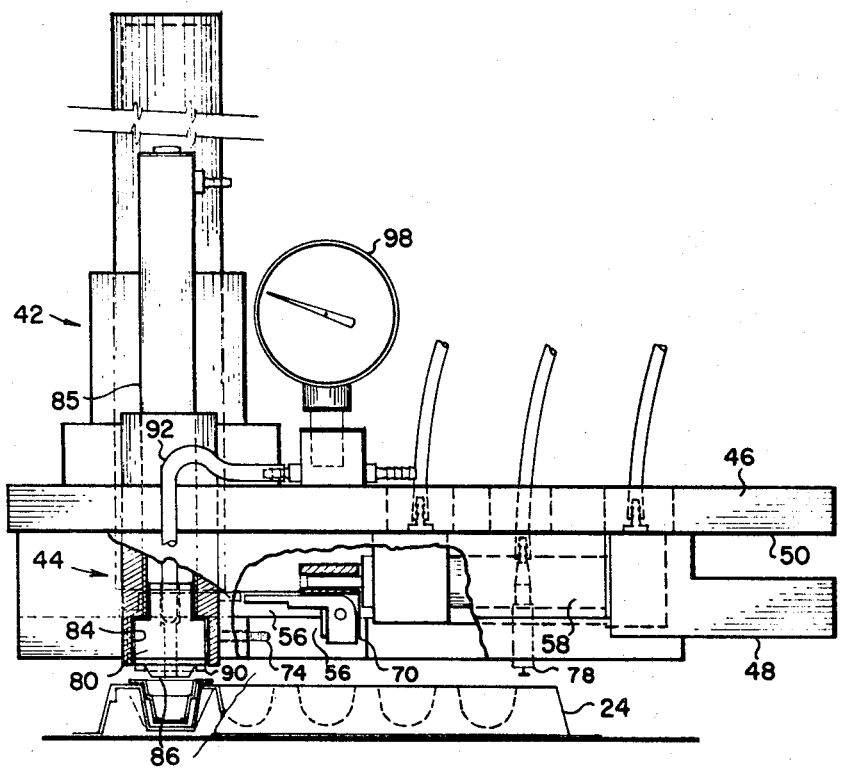
FIG. 5 is a side elevation of a filter cup dispenser and mechanism for applying a vacuum embodying the principles of the present invention, portions thereof being broken away to show the relationship of the parts.
Figure 7:
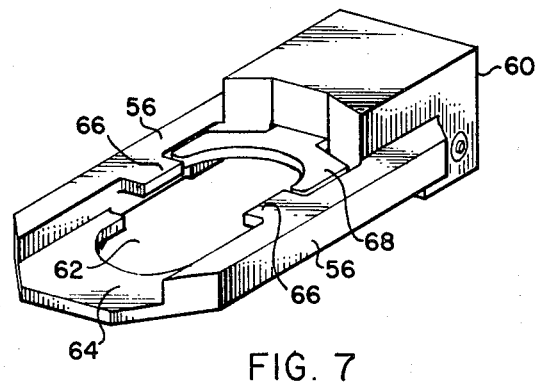
FIG. 7 is a detail perceptive view of the filter cup feed gate, on a larger scale.
Figure 8:
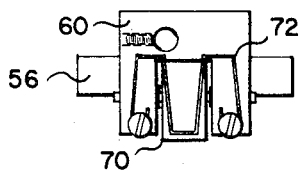
FIG. 8 is a rear elevation of the filter cup feed gate of FIG. 7.

The dispenser or loader 42 includes a filter cup magazine 52 of cylindrical form which is in alignment with a circular aperture 54, and a filter cup feed gate 56 movable horizontally therebetween by means of a horizontal air cylinder 58 conveniently coupled to a connector block 60 forming part of the feed gate (FIGS. 5, 6 and 7). As best seen in FIG. 7, feed gate 56 is provided with an elongated opening 62 and a pair of vertically displaced, U-shaped supporting surfaces, one at each end of the opening. The lower supporting surface 64 engages under the rim of the lowermost filter cup 30 in the magazine 52, the upper surface being defined by a pair of tabs or projections 66, flanking the opening 62, and a pivotally mounted, U-shaped ejector 68. The ejector is formed with a block 70 (FIG. 5) which is pivotally mounted in the connector block 60 and is normally disposed in the horizontal plane of the projections or tabs 66, being held in such normal position by means of a generally M-shaped torsion spring 72 secured to the back of connector block 60 with the middle portion of the spring pressing against the back of block 70, FIG. 8.

Figure 9:
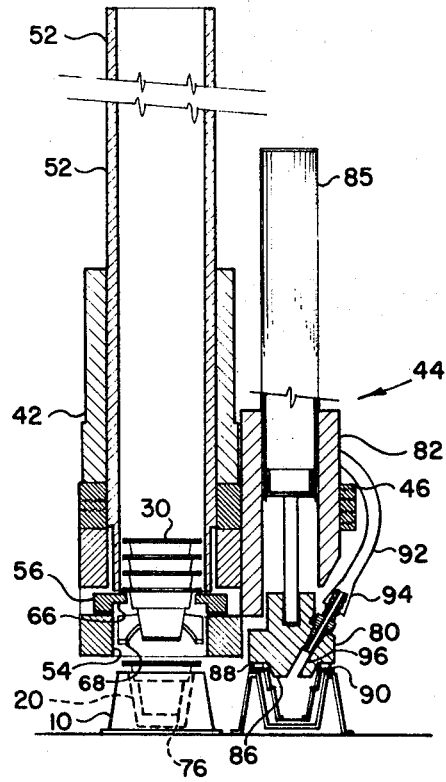
FIG. 9 is a front elevation, in section, showing the essence of the filtering mechanism and illustrating its application to the capsule and filter cup of FIGS. 1–4.

During movement of feed gate 56 from its normal position, the lower supporting surface 64 slides out from under the rim of the lowermost filter cup 30 while tabs or projections 66 engage under the rim of the next higher filter cup, the block 70 is engaged by an adjustable set screw 74 (FIG. 5) for pivoting the block and the ejector 68 near the end of such movement to ensure dropping of the lowermost filter cup through aperture 54 and into cup or well 20 of a sample capsule where it floats on the surface of a fluid 76 in the well, (FIG. 9). Upon return movement of the feed gate 56, the ejector 68 returns to its normal horizontal position, projections 66 slide out from under the rim of the filter cup 30 resting thereon, dropping the cup onto the lower U-shaped supporting surface 64, and the dispenser or loader 42 is conditioned for feeding another filter cup.

A trigger 78, actuated by the capsule 10 rising thereagainst, serves to initiate action for dispensing a filter cup. It will be appreciated that instead the loader could be lowered to effect relative movement therebetween.

The device or mechanism 44 for applying a vacuum to the filter cup in the capsule includes a vacuum head 80, of noncircular, horizontal cross-section, spaced one capsule width from the dispenser or loader 42 and mounted for vertical movement in a sleeve 82, the lower end of which is suitably slotted, as at 84, to accommodate the vacuum head.

Vacuum head 80 is coupled to a vertical cylinder 85 and is formed with a dependent portion 86 and a shoulder 88 therearound to which a generally circular gasket 90, of foam rubber or like material, is sealed. A continuous low vacuum supply (not shown) is adapted to be connected to the vacuum head by means of a pipe 92 and a pipe fitting 94 disposed in a bore or passageway 96. Actuation of the vertical air cylinder 85 is tied in with the raising of the capsules 10 so that when the capsule under the vacuum head 80 is raised, the head presses the gasket 90 against the rim of the filter cup 30 pressing the filter cup down and effecting a seal to the end that the suction of the continuous vacuum lowers the pressure within the filter cup, causing clear filtrate to be drawn into the filter cup through the porous bottom thereof. The enlargements, or scallops 20a and b, vent the air and provide space and additional volume to accommodate the fluid which wells up when the filter cup is pressed down. Upon retraction of the vacuum head 80, the lower end of the sleeve 82 engages the filter cup rim for holding it and breaking the seal.

If desired, a vacuum gauge 98 may be connected intermediate pipe 92 and the source of continuous vacuum.

OPERATION

In the operation of the filtering mechanism, let it be assumed that the first capsule 10 has arrived under the filter cup dispenser or loader 42 and relative vertical movement occurs, either raising the capsule to the loader or lowering the loader to the capsule. This actuates trigger 78 which initiates a feeding action of dropping the lowermost filter cup into the capsule. Relative movement between capsule and loader occurs and the capsule is advanced to a position under the vacuum application device 44. Approaching vertical movement between the capsule and the vacuum application device brings gasket 90 into engagement with the rim of the filter cup 30, forcing the bottom of the cup down into the fluid 76 until the cup rim is resting on the body 12 of the capsule and a seal is effected between the gasket and the rim. The suction of the continuous vacuum lowers the pressure within the filter cup, causing clear filtrate to be drawn into the filter cup through the porous filter paper bottom thereof. Vertical movement effecting separation of the capsule and the vacuum application device causes the lower end of sleeve 82 to engage the filter cup rim and break the seal between the gasket and the rim.

For a fuller understanding of the environment of use and the relation of the capsule and filtering mechanism of the present invention to other components and phases of an automated chemical analyzer, reference may be had to the aforementioned application Ser. No. 699,618.

There has thus been provided a sample capsule and filtering mechanism employing a filter cup in which the filtering of a fluid is performed in a reliable and facile manner while contained in a capsule and is performed with new and improved mechanisms.

Although the present invention has been described in detail in connection with one illustrative embodiment, it should be understood that the novelty of the invention is not limited to the specific embodiment illustrated and described but is defined only by the scope of the appended claims.

What is claimed is:
1. A sample capsule comprising:
   a hollow, open bottom body structure of plastic material having a plurality of cups formed therein, at least one of said cups having a side wall construction the major portion of which is frusto-conical and is joined by inverted semiconical portions for providing enlargement of space therein.

2. A filter cup for use in an automated filtering mechanism comprising:
   an open bottom body of plastic material, said body having a lower frusto-conical portion, an upper cylindrical portion of greater diameter than said lower portion and joined to the top thereof to provide an annular shoulder, and a rim atop said cylindrical portion; and
   a thickness of porous filter material joined to the lower end of said lower frusto-conical portion and closing the open bottom of said body.

3. The filter cup of claim 2 wherein:
   said filter material is filter paper.

4. Apparatus for effecting filtering of a fluid in a container utilizing a filter cup having an upper outwardly extending rim and a bottom of filter material comprising, in combination:
   a dispenser adapted to receive a supply of filter cups and to drop a single cup upon actuation; and
   means adjacent said dispenser for applying a vacuum to said filter cup, said means including a vertically movable vacuum head connected to a continuous low vacuum supply and a gasket on said head for effecting a seal with the rim of said cup.

5. The combination of claim 4 wherein:
said dispenser includes a filter cup feed member having an elongated opening and vertically displaced supporting surfaces, one at each end thereof, the lower supporting surfaces supporting the lowermost filter cup by engaging under the rim thereof, the upper surface engaging under the rim of the next higher filter cup;
whereby movement of said feed member in one direction serves to disengage said lower supporting surface from the rim of the lowermost filter cup and movement in the opposite direction serves to slide the upper supporting surface from under the rim of the next higher filter cup and drop it onto the lower supporting surface.

6. The combination of claim 5 wherein:
a pivoted ejector forms part of the upper supporting surface and ensures that the lowermost filter is dropped at the end of movement in said one direction.

7. A sample capsule and mechanism for filtering a fluid comprising, in combination:
a sample capsule having a compartment therein adapted to contain a fluid requiring filtering;
a filter cup having a body portion adapted to enter into said compartment, said cup having a rim which limits the extent of entry of said cup into said compartment and a bottom of filter material;
means for applying a vacuum to said cup for lowering the pressure therein and drawing a filtrate up through said bottom of filter material; and
said means for applying a vacuum comprising reciprocating means for engaging said rim and effecting a seal thereagainst and thereafter disengaging from said rim.

8. A sample capsule and mechanism for filtering a fluid comprising, in combination:
a sample capsule having a compartment therein adapted to contain a fluid requiring filtering;
said compartment having a bottom and side surface the major portion of which is frusto-conical and is joined by diametrically disposed inverted semiconical surfaces merging therewith;
a filter cup having a body portion adapted to enter into said compartment, said cup having an annular rim and a bottom of filter material;
said annular rim being of a diameter which is less than the diametrical distance between the top edges of the semiconical surfaces but greater than the diametrical distance between the top edges of the frusto-conical surfaces; and
means for applying a vacuum to said cup for lowering the pressure therein and drawing the filtrate up through said bottom of filter material.

9. The combination of claim 8 wherein:
said means for applying a vacuum comprises a vacuum head including including an annular shoulder having a gasket substantially coextensive with said filter cup rim and mounted for relative vertical movement for effecting a seal thereagainst.

References Cited
UNITED STATES PATENTS

| | | | |
|---|---|---|---|
| 2,564,174 | 8/1951 | Roman | 210—406 XR |
| 3,219,421 | 11/1965 | Schwarz et al. | 23—292 |
| 3,356,462 | 12/1967 | Cooke et al. | 23—292 |

OTHER REFERENCES

Abers, E. L., Nucleonics, October 1948, pp. 43, 44.

Fisher, 63 Modern Laboratory Appliances, 1962, p. 432.

MORRIS O. WOLK, Primary Examiner

R. M. REESE, Assistant Examiner

U.S. Cl. X.R.

23—253; 210—406